Patented May 26, 1942

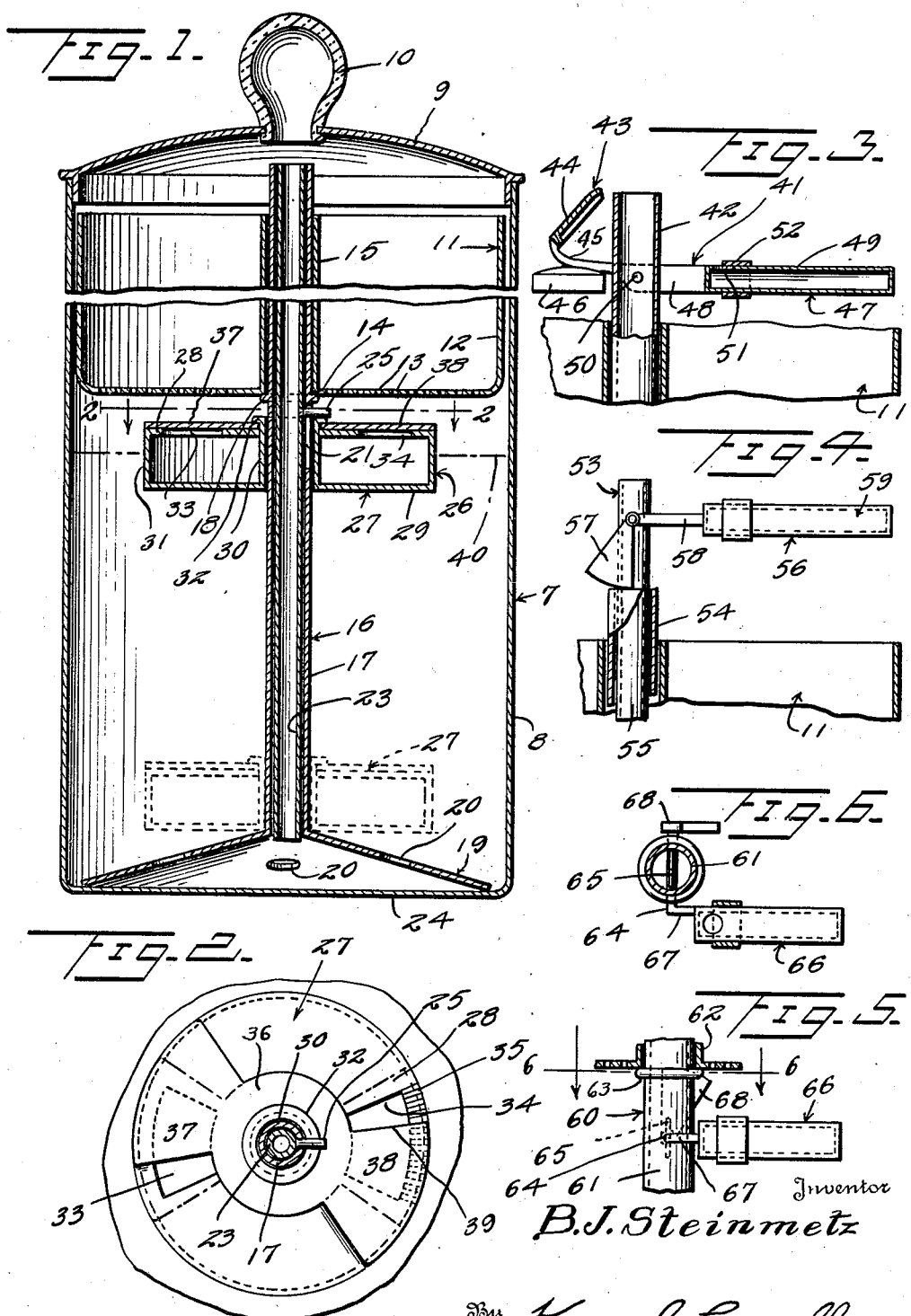

2,283,957

UNITED STATES PATENT OFFICE 2,283,957

COFFEE PERCOLATOR

Benjamin J. Steinmetz, Cedarhurst, N. Y.

Application April 1, 1940, Serial No. 327,339

8 Claims. (Cl. 53—3)

This invention relates to an improvement in coffee percolators.

The invention aims to provide a percolator with means whereby the intensity of the brew may be controlled to result in a weak, medium or strong beverage.

The invention further aims to provide a percolator with means for automatically controlling the intensity of the brew during the percolating operation.

The invention further aims to provide a percolator with means for shutting off the feed of the hot fluid to the coffee during the percolating operation to thereby control the intensity of the brew.

The invention further aims to provide a percolator for brewing a coffee beverage of the desired intensity.

The invention further aims to provide a coffee percolator including adjustable means for automatically cutting off the percolating operation.

The invention further aims to provide a percolator for the purpose set forth which is simple in its construction and arrangement, strong, durable, compact, thoroughly efficient in the use intended thereby, readily assembled and comparatively inexpensive to manufacture.

Embodying the aims aforesaid and others which may hereinafter appear, the invention consists of the novel construction, combination and arrangement of parts as will be more specifically referred to and illustrated in the accompanying drawing, wherein is shown embodiments of the invention, but it is to be understood that changes, variations and modifications may be resorted to which fall within the scope of the invention as claimed.

In the drawing:

Figure 1 is a vertical sectional view of a percolator in accordance with this invention, Figure 2 is a section on line 2—2 Figure 1, Figure 3 is a fragmentary view in elevation and vertical section of a modified form of percolator in accordance with this invention, Figure 4 is a view similar to Figure 3 of another modified form of percolator in accordance with this invention, Figure 5 is a fragmentary view in side elevation and vertical section of still another modified form of percolator in accordance with this invention, and Figure 6 is a section on line 6—6 Figure 5.

With reference to Figures 1 and 2, the open top container, receptacle, pot or hollow body of a percolator 7 is indicated at 8. The removable lid for the container 8 is designated 9 and it includes a hollow transparent sight member 10. The latter is closed at its top and open at its bottom. The annular open top holder for the coffee to be brewed is designated 11 and includes an annular body 12 provided with a screen-like bottom 13 having an axial opening 14 to the wall of which is secured the lower end of a vertically disposed tube 15 corresponding in its length to the height of body 12. The container 8, lid 9, member 10 and holder 11 are of known form.

In percolators including the elements aforesaid there is correlated with such elements a means for conducting hot water and hot beverage to percolate through the coffee in the holder. The said means consists of a vertical pipe which supports the holder and is connected at its lower end to the apex of and opens into a hollow conoidal-shaped member, forming a receiver for hot water and hot beverage seated on the bottom of the container. The said member is formed with combined hot water and hot beverage intake openings. The said means is employed in the form of percolator as shown by Figures 1 and 2, but it does not conduct the hot water and hot beverage to a point for percolating through the coffee in the holder, although it does support the holder, and the openings in its conoidal shaped member are employed for the intake of hot water and hot beverage therein for entering a conducting element to be referred to. The said means is also employed for a function which it does not now form and such function will be referred to. The said means, as employed in a percolator in accordance with this invention, is slightly changed and such change will be referred to. The said means is generally indicated at 16 and includes the vertically disposed pipe 17 formed intermediate its ends with an anular boss 18, the hollow conoidal-shaped member 19 at the lower end of pipe 17 is formed with the hot water or hot beverage intake openings 20. The pipe 17 extends up through tube 15 of the holder 11 and the latter is supported on the boss 18. The foregoing is of known arrangement. The change in the means 16 resides in providing the pipe 17 lengthwise thereof and directly below the boss 18 with a slot 21.

The percolator, in accordance with this invention and as shown by Figures 1 and 2 includes a vertically disposed hot water or hot beverage conducting pipe or element 23 for feeding hot water and hot beverage to be percolated to the coffee in the holder 11. The pipe 23 is normally open at both ends, is arranged in the pipe 17, has a close sliding fit with the latter and has its lower end normally elevated above the bottom 24 of the container 8. The normal position of pipe 23 is with its lower end depending from pipe 17 into the upper portion of member 19 for the intake of hot water or hot beverage and with its upper end flush with the upper end of pipe 17. The pipe 23, intermediate its ends has fixedly secured thereto a laterally disposed stud or pin 25, which extends through and projects from the slot 21 in pipe 17. When pipe 23 is in its normal position the stud 25 is disposed in proximity to the boss 14 and arranged at the upper portion of the slot 21. The pipe 23 is releasably sustained in its normal position aforesaid by a float controlled means 26, to be referred to, for controlling the intensity of the brew. When the pipe 23 is released from its sustained normal position it drops by gravity until its lower end abuts and is closed by the bottom 24 of container 8 whereby the intake of hot water or hot beverage to pipe 23 is shut off. The said bottom 24 functions as a hot water cut-off valve for pipe 23. The correlation of the stud 25 with the side walls of the slot 21 prevents the revolving of pipe 23 relative to pipe 17. The correlation of the stud 25 with the top wall of slot 21, when pipe 23 is set in normal position provides for the upper ends of pipes 17, 23 aligning.

That portion of the pipe 17 of the means 16 below the upper end of slot 21 provides a guide for the float controlled sustaining means 26 for the pipe 23. The means 26 includes a hollow buoyant annulus 27 constituting a sustaining member. The annulus 27 is formed of a top 28, a bottom 29, an inner tubular side 30 which encompasses and is slidable relative to pipe 17, and an outer side 31. The inner side 30 extends above the top 28 and it is formed at its upper end with an outwardly directed annular flange 32 which overlaps in spaced relation the inner marginal portion of the upper face of said top 28. The latter is formed with a pair of diametrically opposed oppositely extending sector-shaped openings 33, 34. The upper edge of top 28 bordering the opening 34 is formed with a series of parallel graduations 35 for a purpose to be referred to. Revoluble about the upper end of the inner side 30 of the annulus 27 and confined on the top 28 by the flange 32 is a circular disc 36 formed with a pair of diametrically opposed oppositely extending sector-like wings 37, 38 for extension across the outer portion of openings 33, 34 respectively. The disc 36 in connection with the wings 37, 38 constitute a closure for adjustable closing the openings 33, 34 and also a controller for the sustaining means 26. The disc 36 permanently closes the inner portion of said openings. The outer portions of said openings constitute beverage intakes for the annulus 27 and the wings 37, 38 are for simultaneously varying the dimensions of the beverage intakes. The disc 36 and wings 37, 38 are bodily revoluble. The disc 36 has a close sliding fit with flange 32 and the upper face of top 28. The wings 37, 38 have a close contact with the upper face of top 28. The edge 39 of the wing 38 correlates with the graduations 35 for determining the adjustment of the wings to obtain the desired dimensions of the beverage intakes for the annulus 27. The graduations 35 may have correlated therewith suitable indicia, not shown.

The water line is indicated at 40 and the normal position of the annulus 27, with respect to the water line, is as shown by Figure 1, the annulus being free of beverage or water, and with the upper end of the inner side 30 of the annulus 27 bearing against the stud 25 thereby maintaining or sustaining the pipe 23 in its normal elevated position. When percolating, a portion of the beverage is employed for lowering the annulus 27 from its engaged or sustaining position with the stud 25 to permit of the pipe 23 moving downwardly by gravity to have its lower end closed by bottom 24 of container 8 for the purpose of discontinuing the percolating operation. During percolating, a portion of the beverage will enter into the annulus 27 through the beverage intakes for the latter and when the weight of that portion of beverage received by the annulus overcomes the buoyant characteristic of the latter, the annulus will move downwardly by gravity about the pipe 17 and the aforesaid operation of the pipe 23 will be had to discontinue the percolating operation. When the dimensions of the beverage intakes for the annulus 27 are small, the gravity lowering of the annulus will be delayed longer than when the dimensions of said intakes are large, as it will take longer for the annulus to receive an amount of beverage to overcome its buoyancy than when the dimensions of said intakes are large; under such condiitions the intensity of the brew may be readily controlled by the dimensions of the beverage intakes, therefor by the simultaneously adjusting of the dimensions of the beverage intakes for the annuls a resulting weak, medium and strong coffee beverage may be had.

With reference to the form 41 of the invention as shown by Figure 3, the means 16 will be employed without the pipe 17 thereof being slotted and the pipe or element 23 and the means 26 omitted. In Figure 3 the pipe 42 corresponds in all details to pipe 17 when the latter is not slotted. The pipe 42 functions to conduct the hot water and hot beverage to a point for percolating through the coffee in the holder. In form 41 the discharge of hot water or hot beverage to discontinue percolation is cut-off at the upper end of pipe 42 and not at its lower end by the bottom of container 8, and for the purpose of closing said upper end an automatically operable closing means 43 is provided for the upper end of pipe 42. The means 43 includes a valve 44 normally inclining towards and arranged below the upper end of pipe 42, an inwardly directed curved stem 45 connected at one end to and extended from one side of the valve 44, a counterweight 46 for and integral with stem 45 intermediate the ends of the latter, and a pivoted shifter 47 for moving valve 44 to seat on the upper open end of pipe 42 to close said upper end. The shifter 47 includes a shank 48 which is connected at its inner end to one end of a hollow receiver 49 in which is to be collected a portion of the hot beverage. The shank 48 in proximity to its outer end is pivotally connected to the outer face of pipe 42, as at 50. The outer end of shank 48 is integral with the other end of stem 45. The receiver 49 is formed with a hot beverage intake 51 in its top. The intake 51 is disposed in proximity to that end of the receiver, which is connected to the shank 48. The dimensions of said intake 51 are controlled by a sleeve 52 slidably mounted about the receiver 49. The normal position of the means 43 is as shown by Figure 3 and in such position the receiver 49 is disposed horizontally and spaced above and over the holder for the coffee. During percolation when the hot beverage is projecting from the upper end of pipe 42, it will not only fall into the coffee, but a part thereof will enter the receiver through the intake 51. When the weight of the hot beverage within the receiver overcomes the counterweight 46 for the valve, the receiver will swing downwardly on its pivot to thereby shift the valve to seat on the upper end of pipe 42, whereby such end will be closed and the percolating operation will be discontinued. The coaction of the valve with the top edge of pipe 42 limits the extent of the downward swing of the receiver. Otherwise than that as stated the form 41 will be the same as the form shown by Figures 1 and 2.

With reference to the form 53 of the invention, as shown by Figure 4, it will correspond to the form shown by Figures 1 and 2 with the exception that the pipe 54 of the form 53 which corresponds to the pipe 17 is not slotted, that the pipe 55 of the form 53 which corresponds to the pipe 23 is not provided intermediate its ends with a stud, that the pipe 55 normally extends above the pipe 54 and that the sustaining means 26 shown by Figures 1 and 2 is omitted.

The pipe 55 is normally sustained in an elevated position and in extended relation with respect to the upper end of pipe 54 by an automatically operable sustaining means 56, which correlates with the top edge of pipe 54. The means 56 includes a depending sustaining lever 57 of triangular contour fixed at its apex to the outer end of the shank 58 of a shifter 59 for lever 57. The outer end of the shank 58 is pivotally connected to and disposed exteriorly of pipe 55, as at 59. The shifter 59 corresponds in form and functions in the same manner as the shifter 47. The normal position of the lever 57 is in mounted relation on the top edge of pipe 54 and releasably retains the pipe 55 in its extended position as shown by Figure 4. When the weight of the quantity of hot beverage collected in the shifter 59 lowers the latter, the lever 57 is swung in a direction to clear the top edge of pipe 54 whereby pipe 55 will lower by gravity to have its lower end closed by the bottom of the container. Otherwise than that as stated form 53 will be the same as the form shown by Figures 1 and 2.

The form 60 of the invention, as that shown by Figures 5 and 6, will correspond to the form shown by Figures 1 and 2 with this exception that the sustaining means 26 and the pipe 23 are omitted. In Figures 5 and 6 a pipe is indicated at 61, which corresponds to the pipe 17, but it is not provided with a slot 21 as is pipe 17. The pipe 61 functions to conduct hot water and hot beverage for percolation through the coffee in the holder 62. The latter corresponds in form to the holder 11. The pipe 61 below and in proximity to its peripheral boss 63 has pivotally mounted therein and diametrically thereof a shaft 64 carrying a valve 65 arranged within the pipe 61. The valve 65 is normally opened and, when moved from normal, acts to close the pipe 61 for the purpose of discontinuing the percolating operation. The shaft 64 is shifted in a direction to move the valve 65 to close the pipe 61 by a shifter 66 of the same construction as and functioning and operated in the same manner as the shifters 47, 49. The shifter 66 includes a shank 67 fixed at its outer end to one end of the shaft 64. The latter at its other end has a counterbalance 68.

Before the start of a percolating operation with respect to any one of the forms of percolators as shown the annulus 27 and shifters 47, 56 and 66 are entirely emptied of water or beverage.

What I claim is:

1. In a percolator, a holder for the material through which a fluid is adapted to percolate, means disposed axially of said holder for directing the fluid onto the material, an initially buoyant and subsequently gravity lowering fluid receiving structure of container-like form disposed in the downward path of the fluid for receiving a predetermined portion of the latter to lower it, and means operatively connecting said structure and said directing means for effecting closing of said directing means upon lowering of said structure thereby discontinuing the percolating operation.

2. In a percolator, a holder for the material through which a fluid is adapted to percolate, means disposed axially of said holder for directing the fluid onto the material, an initially buoyant and subsequently gravity lowering fluid receiving structure of container-like form disposed in the downward path of the fluid for receiving a predetermined portion of the latter to lower it, means operatively connecting said structure and said directing means for effecting closing of said directing means upon lowering of said structure thereby discontinuing the percolating operation, said structure having its top formed with fluid intakes, and means for varying the dimensions of said intakes for controlling the period of the closing of said directing means.

3. In a percolator, a receptacle adapted to contain a fluid, a holder within the receptacle for the material through which the fluid is adapted to percolate, a pipe disposed axially of the holder and including means for supporting the latter, said pipe being formed with a lengthwise slot below and in proximity to said means and with a conoidal-shaped apertured fluid intake at its lower end seated on the bottom of the receptacle, a vertically disposed fluid directing means in said pipe formed with a lateral lug extending through said slot, and an initially buoyant and subsequently gravity lowering fluid receiving structure of container-like form disposed in the downward path of the fluid for receiving a predetermined portion of the latter, said structure encompassing said pipe and coacting with said lug for initially elevating the fluid directing means to open position for the passage of fluid therethrough and said structure upon receiving a predetermined portion of the fluid on the downward flow of the latter moving downwardly by gravity whereby said fluid directing means automatically shifts to closed position thereby discontinuing the percolating operation.

4. In a percolator, a holder for the material through which a fluid percolates, means for directing fluid onto the material, an adjustable means controlled by the fluid for controlling the extent of the percolating operation to vary the intensity of the brew, said means including a structure pivoted to said directing means and including a normally buoyant gravity movable part and a valve part acting to close said directing means when said other part is lowered, said adjustable means being arranged in the downward path of the fluid.

5. In a percolator, a holder for the material through which a fluid percolates, a pipe for directing fluid onto the material, means carried by the pipe and removably engaging with the holder for releasably maintaining said pipe in open position, and an initially buoyant subsequently gravity lowering fluid receiving structure of container-like form disposed in the downward path of the fluid for receiving a predetermined portion of the latter to lower it, said structure being connected to said means and when buoyant maintaining said means in engagement with the holder to open the pipe and when lowered shifting said means clear of the holder to provide for the closing of the pipe.

6. In a beverage brewing apparatus of the percolator type through which a fluid is adapted to percolate, means for circulatively directing the fluid onto the material, an initially buoyant and subsequently gravity lowerable fluid receiving container-like structure disposed in the path of the fluid as it leaves the material holder, for receiving a predetermined portion of the fluid and caused by the fluid received therein to gradually lose buoyancy and assume a lowered position, and said structure and said directing means operatively related to effect a discontinuance of the percolating operation upon the lowering of said structure to a predetermined point.

7. In a beverage brewing apparatus of the type including a fluid receiving and containing chamber, a holder for the material through which the fluid percolates, and a transfer means for effecting circulation of the fluid from the chamber and through the holder; an initially buoyant and subsequently gravity lowering structure for receiving a predetermined amount of the fluid in the course of circulation and adapted to shut off the flow of fluid through the material holder at a predetermined time, governed by the loss of buoyancy of said structure.

8. In a percolator, a brew material holder, a brew receiving and containing chamber, a transfer means for circulating the brew through said holder from and back into said chamber, and a container-like means arranged in the circulatory path of the brew for trapping a part thereof on its downward flow, said container-like trapping means operatively related to said circulating means and actuatable by the weight of the entrapped liquid to stop circulation of the brew through said material holder.

BENJAMIN J. STEINMETZ.